Oct. 20, 1942.  T. A. CARLSON ET AL  2,299,563
REVERSING GEAR MECHANISM
Filed Aug. 31, 1940
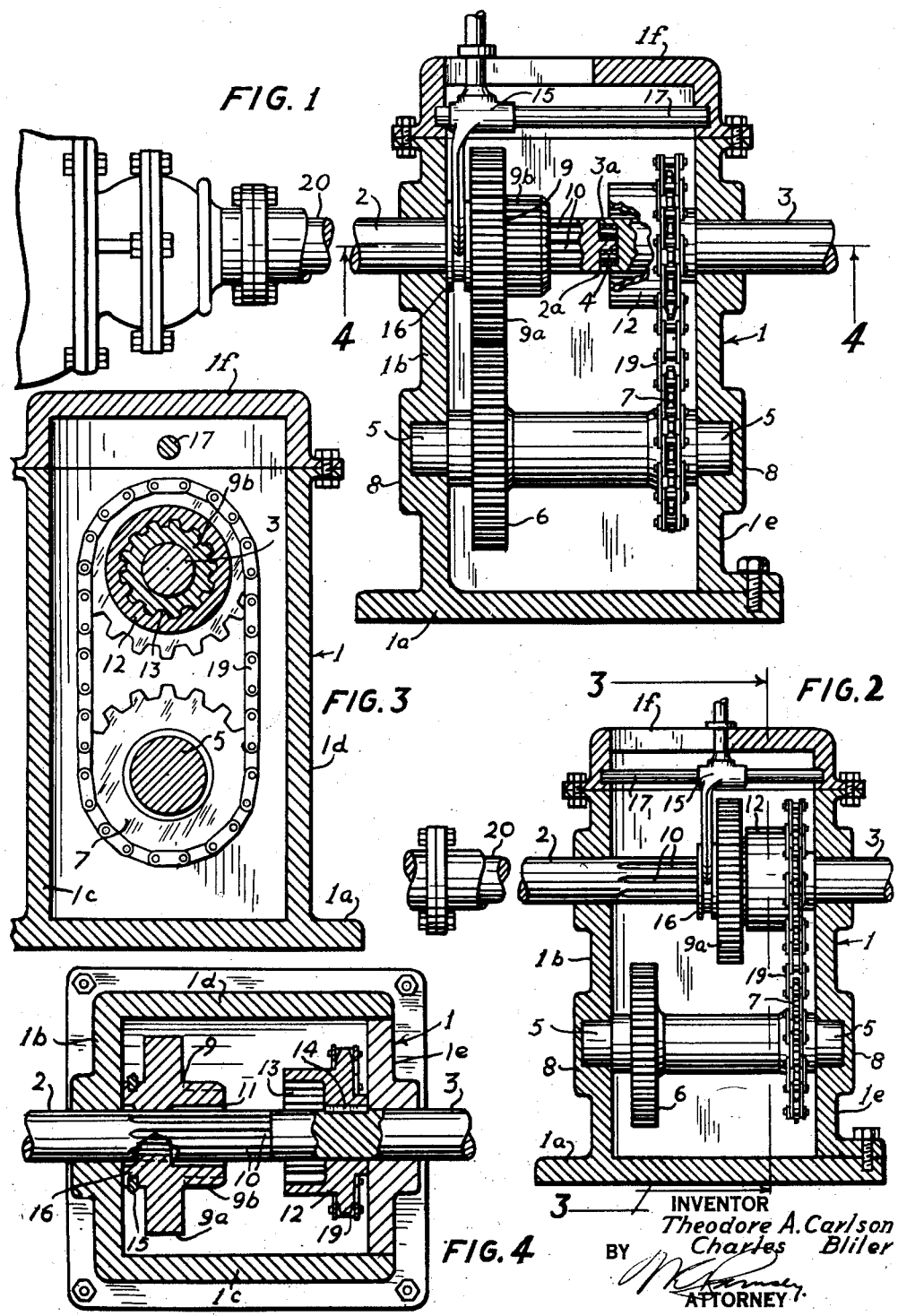
INVENTOR
Theodore A. Carlson
Charles Bliler
BY
ATTORNEY Patented Oct. 20, 1942

2,299,563

UNITED STATES PATENT OFFICE 2,299,563

REVERSING GEAR MECHANISM

Theodore A. Carlson, Portland, and Charles Bliler, Valsetz, Oreg.

Application August 31, 1940, Serial No. 355,006

3 Claims. (Cl. 74—376)

The object of this invention is to provide a selective reversing gear mechanism in which power can be transmitted thru axially alined shafts by a simple jaw clutch mechanism or can be reversed by disengaging the clutch and simultaneously engaging a reversing gear, the movable selective gear and the movable clutch member being connected or formed into an integral structure.

A further object of our invention is to attain the foregoing object with a structure in which the movable gear is a step-down or compound gear member in form comprising two elements, the larger gear element being adapted to engage the reversing gear and the smaller gear element being adapted to engage an internal gear on the driven shaft, said clutch parts and reversing gear being spaced so that at opposite throws of the control handle either said reversing gear or said clutch will be engaged and the other will become disengaged.

A further and more general object of our invention is to provide reversing gear mechanisms of this character which may be simply constructed, which is strong, and in which the parts are so arranged that undue wear will be avoided. The reversing gear is proportioned and arranged so that the driving shaft may drive the driven shaft forwardly or reversely at speeds of rotation equal to that of the driving shaft.

Further details of our invention are hereinafter described with reference to the accompanying drawing, in which:

Fig. 1 is a foreshortened vertical sectional view in which parts are shown broken away to disclose details of construction;

Fig. 2 is a similar view on a smaller scale of the reversing mechanism in which the parts are arranged to drive the driven shaft directly in the same direction of rotation;

Fig. 3 is a transverse sectional view taken on the line 3—3 in Fig. 2 to illustrate the manner in which the clutch parts are arranged in engaging position; and Fig. 4 is a horizontal sectional view taken on the line 4—4 in Fig. 1 to illustrate details of construction.

A reversing gear mechanism embodying our invention comprises a housing 1 in which are journalled a driving shaft 2 and a driven shaft 3. Said shafts are journalled in the opposed sides of the housing and are axially alined. The ends of said shaft are preferably journalled one in the other. The end of 2a of the driving shaft is provided with a trunnion and the end 3a of the driven shaft is provided within a cup-shaped aperture. Within said cup-shaped aperture and surrounding said trunnion is an anti-friction bearing element 4.

Also journalled in said housing is a jack shaft 5, which is illustrated as being a solid member, upon which is formed reverse gear 6 and a sprocket 7. That is, said jack shaft, said reverse gear and said sprocket are shown as an integral structure. We deem this a matter of design, however, and said members and the hubs thereof can be separate structures provided that the reverse gear and the sprocket are joined together so that there can be no relative rotation between said members. The ends of the jack shaft are journalled in bosses 8 formed in the sides of the housing. The said housing 1 preferably is made with a base 1a, one side 1b, ends 1c and 1d integral therewith. The other side 1e, however, and the top or cap 1f are preferably made separate and are secured to the remainder by bolts so that said housing can be taken down to aid in inspection, repair or replacement of the parts therein.

Slidably mounted on the driving shaft 2 is a compound or step-down gear member 10. The bore of said gear member is provided with a series of splines which are adapted to engage a series of longitudinal slots 10 on the driving shaft 2 so that there can be no relative rotation of said compound gear member and said driving shaft. This is best illustrated in Fig. 4. Said slots extend to the end of the driving shaft and a portion of said gear member 9 is relieved as at 11 so that said relieved portion can extend over the end 3a of the driven shaft to eliminate possibility of drag or friction. Said gear member 9 has two gear elements, a larger gear element 9a and a smaller gear element 9b. The larger gear element is adapted to move into intermeshing engagement with the reverse gear 6, in the manner illustrated in Fig. 1. The smaller gear element is adapted to be moved into engagement with an internal gear 13 formed within the cup-shaped sprocket member 12 fixed to the end of the driven shaft by a key 14. This is best illustrated in Fig. 2. Said compound gear member is slid longitudinally of the driving shaft 2 by a fork member 15 which engages collar 16 on said gear member 9. It is optional whether said fork member slides along a guide rod 17 or is pivotally mounted to produce said movement of the compound gear member. A sliding type of fork is shown, however, for illustration. The end of said fork member extends outside of the housing and said fork member is permitted to move longitudinally of a slot 18 in the top or cap 1f of the housing.

Sprocket member 12 and sprocket 7 on the jack shaft are operatively engaged by an endless chain 19 which engages the teeth of the sprockets. Said sprockets preferably are of the same pitch diameter. The larger gear of the step-down or compound gear member and the reverse gear also are preferably of the same diameter and thus the driving shaft drives the driven shaft at the same speed of rotation in reverse as it does when said shafts are joined together by engagement of the smaller gear 9b with the internal gear 13 on the driven shaft.

The reversing gear mechanism embodying our invention is shown illustrated in connection with a propelling shaft 20. The external housing of a transmission or other device is shown in connection with said propelling shaft. Our reversing gear has particular application to hoists, marine drives, and other types of power mechanisms which must be driven more or less with equal facility in either direction. We have observed that reverse mechanisms generally are thus not adapted. When devices of this character are run in reverse for substantial periods of time the reversing gears become badly worn and are considered a weak portion of said mechanism and it is to correct this fault that our invention was conceived.

The reversing mechanism operates as follows:

When the parts are arranged as they are illustrated in Fig. 1, power is transmitted from the driving shaft 2 through the reverse gear 6 so as to drive the driven shaft 3 in the opposite direction of rotation but at the same speed of rotation. This is accomplished by intermeshing the larger gear 9a of the compound gear member 9 with reverse gear 6. The sprocket 7 rotates in the same direction as the reverse gear. Sprocket 7 rotates the cup-shaped sprocket member 12 and the driven gear at the same speed and in the same direction that the reverse gear is driven. When the parts are arranged as illustrated in Fig. 2, however, gear element 9a is out of engagement with reverse gear 6 and the smaller gear element 9b is in engagement with the internal gear 13. Thus, driving shaft 2 and driven shaft 3 are interconnected and operate as a solid shaft, the jack shaft merely idling in its bearings.

The movement by the shifting fork of said step-down or compound gear member 9 from one position to another is accomplished as readily in our reversing mechanism as any type of selective spur gear transmission. It is to be noted that the outer end of the smaller gear element 9b is illustrated as being rounded or "sniped" off so that said gear 9b will intermesh more readily with the internal gear 13 and there will be no holding up, engaging, or cracking off of the corners of said smaller gear 9b.

We claim:

1. In reversing gear mechanism, a housing having two spaced side members, a driving shaft and a driven shaft arranged endwise in axial alinement, being journalled transversely of said housing, said shafts having bearing relation at their adjacent ends one with the other, each of said shafts being journalled in a housing side element, a jack shaft also journalled in said housing between said spaced side members, said jack shaft extending parallel to and being spaced laterally from said driving shaft and said driven shaft, a reverse gear fixed to said jack shaft, means operatively joining said jack shaft and said driven shaft to rotate said two shafts in the same direction, a combined gear and clutch member comprising two externally toothed elements slidably mounted on said driving shaft and held against relative rotation therewith, selective means for sliding said gear and clutch member to either of two positions, one toothed member of said gear and clutch member being adapted in one position to mesh with and to drive said reverse gear, a clutch member fixed to said driven shaft, said clutch member including an internally toothed member adapted to engage the other externally toothed member of said slidable gear and clutch member.

2. In reversing gear mechanism, a housing having two spaced side members, a driving shaft and a driven shaft arranged endwise in axial alinement, being journalled transversely of said housing, said shafts having bearing relation at their adjacent ends one with the other, each of said shafts being journalled in a housing side element, a jack shaft also journalled in said housing between said spaced side members, said jack shaft extending parallel to and being spaced laterally from said driving shaft and said driven shaft, a reverse gear fixed to said jack shaft, chain and sprocket elements operatively joining said jack shaft and said driven shaft to rotate said two shafts in the same direction, a combined gear and clutch member comprising two externally toothed elements slidably mounted on said driving shaft and held against relative rotation therewith, selective means for sliding said gear and clutch member to either of two positions, one toothed member of said gear and clutch member being adapted in one position to mesh with and to drive said reverse gear, a clutch member fixed to said driven shaft, said clutch member including an internally toothed cup-shaped member adapted to engage the other externally toothed member of said slidable gear and clutch member.

3. In reversing gear mechanism, a housing having two spaced side members, a driving shaft and a driven shaft arranged endwise in axial alinement, being journalled transversely of said housing, said shafts having bearing relation at their adjacent ends one with the other, each of said shafts being journalled in a housing side element, a jack shaft also journalled in said housing between said spaced side members, said jack shaft extending parallel to and being spaced laterally from said driving shaft and said driven shaft, a reverse gear fixed to said jack shaft, chain and sprocket elements operatively joining said jack shaft and said driven shaft to rotate said two shafts in the same direction, a combined gear and clutch member comprising two externally toothed elements slidably mounted on said driving shaft and held against relative rotation therewith, selective means for sliding said gear and clutch member to either of two positions, one toothed member of said gear and clutch member being adapted in one position to mesh with and to drive said reverse gear, a clutch member fixed to said driven shaft, said clutch member including an internally toothed cup-shaped member adapted to engage the other externally toothed member of said slidable gear and clutch member, said clutch member spanning the bearing of said driving and driven shafts one with the other.

THEODORE A. CARLSON.
CHARLES BLILER.